United States Patent [19]

Steppan et al.

[11] Patent Number: 5,198,522
[45] Date of Patent: Mar. 30, 1993

[54] REACTION INJECTION MOLDING BASED ON DIETHYL METHYLENE DIPHENYL DIISOCYANATE

[75] Inventors: David D. Steppan, Gibsonia; Robson Mafoti, Pittsburgh, both of Pa.; William E. Slack, Moundsville, W. Va.

[73] Assignee: Miles Inc., Pittsburgh, Pa.

[21] Appl. No.: 810,635

[22] Filed: Dec. 19, 1991

[51] Int. Cl.⁵ .............................................. C08G 18/10
[52] U.S. Cl. ...................................... 528/61; 521/159; 521/160; 521/163; 528/67; 528/68
[58] Field of Search ...................... 521/159, 160, 163; 528/61, 67, 68

[56] References Cited

U.S. PATENT DOCUMENTS 3,180,883 4/1965 Case ................................... 560/359
4,423,200 12/1983 Ganster et al. ........................ 528/67

*Primary Examiner*—Maurice J. Welsh
*Assistant Examiner*—Rachel Johnson
*Attorney, Agent, or Firm*—Joseph C. Gil; Godfried R. Akorli

[57] ABSTRACT

Disclosed herein is an improved polyurea system comprising a reaction product of a polyisocyanate and a polyamine and an amine chain extender, the improvement comprising the polyisocyanate containing diethyl methylene diisocyanate, a prepolymer thereof or a mixture thereof, in an amount sufficient to slow down the reaction for use in a reaction injection molding.

6 Claims, No Drawings

REACTION INJECTION MOLDING BASED ON DIETHYL METHYLENE DIPHENYL DIISOCYANATE

BACKGROUND OF THE INVENTION

The present invention relates to polyisocyanates and other prepolymers and more specifically polyisocyanate prepolymers which are useful in preparing polyureas, particularly in the preparation of reaction injection moldings.

BRIEF DESCRIPTION OF THE PRIOR ART

Prepolymers of polyisocyanates and their reaction with isocyanate-reactive compounds in reaction injection molding processes are generally known in the art. Generally, the prepolymers are prepared by reacting a stoichiometric excess of a polyisocyanate with an isocyanate reactive compound.

Due to the fast reactivity of many of the preferred polyisocyanates with some of the isocyanate reactive compounds, pertinent among which are polyamines, it has been found difficult to fill large molds with molding compositions containing said polyisocyanates and isocyanate reactive compounds. Hence much work has been done in this area to modify the polyisocyanates including polyisocyanate prepolymers in order to slow their reaction with polyamines.

U.S. Pat. No. 3,180,883 relates to diisocyanates such as an aromatic diisocyanate having phenolic hydroxyl groups in which one of the isocyanate groups is hindered or blocked in each ortho position thereto by a member selected from the group consisting of a secondary alkyl, tertiary alkyl, cycloalkyl, aryl, carboalkoxy, dialkyl carboxamido, halogen and a cyano group, in order to render it relatively less reactive than the other isocyanate group, especially with compounds having active hydrogen-containing groups.

U.S. Pat. No. 4,423,200 discloses that it has been found that isocyanate prepolymers, based on toluene diisocyanate, phenyl diisocyanate, or hexamethylene diisocyanate with polyester and/or polyether diols and blended with tetra-alkyldiphenylmethane diisocyanate, then combined with liquid or low-melting aromatic diamines, may easily be processed into cast parts even in high pressure installations The present invention relates to a polyisocyanate and a prepolymer thereof which can be efficiently reacted with polyamines to form polyureas in reaction injection molding processes.

SUMMARY OF THE INVENTION

In accordance with the foregoing, the present invention encompasses an improved polyurea system comprising a reaction product of a polyisocyanate and a polyamine, the improvement wherein the polyisocyanate comprises diethyl methylene diphenyl diisocyanate wherein the ethylene group is in the ortho position relative to the isocyanate groups, a prepolymer of diethyl methylene diphenyl diisocyanate or a mixture thereof, in an amount sufficient to slow down the reaction of the polyisocyanate with the polyamine. The diethyl methylene diphenyl diisocyanate is alternately referred to herein as diethyl methylene diisocyanate, diethylene MDI or DEMDI.

Also encompassed by the present invention is an improved process for preparing polyurea comprising reacting a polyisocyanate with polyamine, the improvement wherein the polyisocyanate comprises diethyl methylene diisocyanate, a prepolymer thereof or their mixture in an amount sufficient to slow down the reaction of the polyisocyanate with the polyamine.

Surprisingly, it has been found that by employing the diethyl methylene diisocyanate and/or its prepolymer in combinations with fast reacting polyamines such as "Jeffamines" (polyoxyalkylene polyamines available from Texaco Chemical Co.) one is able to slow down an otherwise fast reaction, without an adverse effect on the physical properties of the resultant polyureas.

DETAILED DESCRIPTION OF THE INVENTION

Specifically, the diethyl methylene diisocyanate of the invention can be described as 3,3'-diethyl-4,4'-diisocyanato diphenylmethane. The prepolymers of diethyl methylene diisocyanate and/or the prepolymer thereof which are useful herein have an isocyanate content of about 4.4 to 28 percent, and preferably 14 to 27 percent, and weight average molecular weight of 150 to 2000 and preferably 200 to 600. The prepolymers can be prepared by reacting a stoichiometric excess of diethyl methylene diisocyanate with an isocyanate reactive compound having a functionality of about 1.5 to 4 and preferably 2 to 3.

The isocyanate reactive compounds which are useful in the preparation of the prepolymers are preferably polyol. Illustrative but non-limiting examples of the isocyanate reactive compounds can be organic compounds containing at least two isocyanate-reactive groups which are reacted with organic diisocyanates to prepare the isocyanate-terminated prepolymers. The isocyanate reactive compounds can be divided into two groups, i.e., high molecular weight compounds with molecular weights from 400 to about 6,000, preferably from 800 to about 3,000, and low molecular weight compounds with molecular weights below 400. The molecular weights are number average molecular weights ($M_n$) and are determined by end group analysis (OH number). Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred.

Suitable polyester polyols include reaction products of polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include, e.g. ethylene glycol; propylene glycol-(1,2) and -(1,3); butylene glycol-(1,4) and -(1,3); hexanediol-(1,6); octanediol-(1,8); neopentyl glycol; cyclohexanedimethanol (1,4-bis-hydroxymethylcyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol and polybutylene glycol, glycerine and trimethylolpropane. The polyesters may also contain a portion of carboxyl end groups. Polyesters of lactones, e.g. ε-caprolactone or hydroxycarboxylic acids, e.g. ω-hydroxycaproic acid, may also be used.

Polycarbonates containing hydroxyl groups include those obtained from the reaction of diols such as propanediol-(1,3), butanediol-(1,4) and/or hexanediol-(1,6), diethylene glycol, triethylene glycol or tetraethylene glycol with phosgene, diarylcarbonates such as diphenylcarbonate or with cyclic carbonates such as ethylene or propylene carbonate. Also suitable are polyester carbonates obtained from the above-mentioned polyesters or polylactones with phosgene, diaryl carbonates or cyclic carbonates.

Suitable polyether polyols are obtained in known manner by the reaction of starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. Suitable starting compounds containing reactive hydrogen atoms include the polyhydric alcohols set forth for preparing the polyester polyols and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- or 1,1,2-tris-(hydroxyphenyl)-ethane.

Polyethers which have been obtained by the reaction of starting compounds containing amine compounds can also be used, but are less preferred for use in the present invention. Suitable amine starting compounds include ammonia, methyl amine, tetramethylene diamine, ethanolamine, diethanolamine, triethanolamine, ethylene diamine, diethylene triamine, triethylene tetramine, 1,6-hexane diamine, piperazine, 2,5-dimethyl piperazine, 1-amino-3-aminomethyl-3,3,5-trimethyl cyclohexane, bis-(4-aminocyclohexyl)-methane, bis-(4-amino-3-methylcyclohexyl)-methane, 1,4-cyclohexane diamine, 1,2-propane diamine, hydrazine, aminoacid hydrazides, hydrazides of semicarbazido carboxylic acids, bis-hydrazides, bis-semicarbazides, aniline, phenylene diamine, 2,4- and 2,6-toluylene diamine, polyphenylene polymethylene polyamines of the kind obtained by the aniline/formaldehyde condensation reaction and mixtures thereof. Resinous materials such as phenol and cresol resins may be used as the starting materials.

Polyethers modified by vinyl polymers are also suitable for the process according to the invention. Products of this kind may be obtained by polymerizing, e.g. styrene and acrylonitrile in the presence of polyethers (U.S. Pat. Nos. 3,383,351; 3,304,273; 3,523,095; 3,110,695 and German Patent No. 1,152,536). Also suitable as polyethers are amino polyethers wherein at least a portion of the hydroxyl groups of the previously described polyethers are converted to amino groups.

The preferred starting compounds for the polyethers are those compounds which exclusively contain hydroxyl groups, while compounds containing tertiary amine groups are less preferred and compounds containing isocyanate-reactive-NH groups are much less preferred.

Among the polythioethers which should be particularly mentioned are the condensation products obtained from thiodiglycol on its own and/or with other glycols, dicarboxylic acids, formaldehyde, aminocarboxylic acids or amino alcohols. The products obtained are either polythio-mixed ethers, polythioether esters or polythioether ester amides, depending on the co-components.

Suitable polyacetals include the compounds which can be prepared from aldehydes, e.g. formaldehyde, and glycols such as diethylene glycol, triethylene glycol, ethoxylated 4,4'-dihydroxy-diphenyldimethylmethane, and hexanediol-(1,6). Polyacetals suitable for the purpose of the invention may also be prepared by the polymerization of cyclic acetals.

Suitable polyhydroxy polyester amides and polyamines include the predominantly linear condensates obtained from polybasic saturated and unsaturated carboxylic acids or their anhydrides and polyvalent saturated or unsaturated aminoalcohols, diamines, polyamines and mixtures thereof.

Suitable monomers for producing hydroxy-functional polyacrylates include acrylic acid, methacrylic acid, crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate, glycidyl methacrylate, 2-isocyanatoethyl acrylate and 2-isocyanatoethyl methacrylate.

A low molecular weight isocyanate-reactive component having an average molecular weight of up to 400 may also be used. The low molecular weight compounds which may optionally be used in combination with the high molecular weight isocyanate-reactive compounds for the preparation of the isocyanate-terminated prepolymers include the polyhydric alcohols and polyamines which have previously been described for the preparation of the polyester polyols and polyether polyols. Dihydric alcohols are the preferred low molecular weight isocyanate-reactive component for preparing the isocyanate-terminated prepolymers.

In addition to the above-mentioned components which are preferably difunctional in the isocyanate polyaddition reaction, monofunctional and even small portions of trifunctional and higher functional components generally known in polyurethane chemistry, such as trimethylolpropane, may be used in special cases in which slight branching of the isocyanate-terminated prepolymer is desired.

The reaction temperature during prepolymer production is normally maintained below about 150° C., preferably between about 50° and 130° C. The reaction is continued until the content of unreacted isocyanate groups decreases to the theoretical amount or slightly below. It is possible to conduct the prepolymer reaction in the presence of catalysts known to accelerate the reaction between isocyanate groups and isocyanate-reactive groups, such as organo-tin compounds, tertiary amines, etc.; however, the use of a catalyst is generally not necessary and it is often preferred to conduct the reaction without a catalyst.

The prepolymers may be prepared in the presence of solvent provided that the solvent is substantially nonreactive in the context of the isocyanate-polyaddition reaction. The solvents are generally organic and may be comprised essentially of carbon and hydrogen with or without other elements such as oxygen or nitrogen. While it may not be necessary to employ a solvent during formation of the isocyanate-terminated prepolymer, the use of a solvent may be desirable to maintain the reactants in the liquid state as well as to permit better temperature control during the reaction by serving as a heat sink and, if desired, as a refluxing medium. Solvents which may be employed include dimethylformamide, esters, ethers, ketoesters, ketones, e.g., methyl ethyl ketone and acetone, glycol-ether-esters, chlorinated hydrocarbons, aliphatic and alicyclic hydrocarbon-substituted pyrrolidinones, e.g., N-methyl-2-pyrrolidinone, hydrogenated furans, aromatic hydrocarbons and mixtures thereof.

The amount of solvent employed should be sufficient to provide a prepolymer solution having a sufficiently low viscosity to enhance the end use of the prepolymer. Such viscosities may be as low as 100 centipoise or above 10,000 centipoise, e.g. as high as 50,000 centipoise, preferably 40,000 centipoise. It is possible to use about 0.01 to 50 parts by weight of solvent, preferably about 0.1 to 10 parts by weight of solvent, per part by weight of the prepolymer. However, the presence of a solvent for the prepolymer is not necessary to provide a stable, aqueous dispersion. Often, when solvent is employed during the preparation of the isocyanate-terminated prepolymer. A solvent having a higher boiling point than water such as dimethyl formamide, N-methyl-2-pyrrolidinone, and the like may be employed.

Up to 80% by weight, preferably up to 50% by weight of the prepolymer, based on the weight of the isocyanate (A-side component), can comprise other known polyisocyanates. Examples of suitable polyisocyanates which may optionally be used as a portion of the isocyanate component in accordance with the present invention are organic diisocyanates represented by the formula

in which R represents an organic group obtained by removing the isocyanate groups from an organic diisocyanate having a molecular weight of from about 112 to 1,000, and preferably from about 140 to 400. Diisocyanates preferred for the process according to the invention are those represented by the above formula in which R represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6 to 15 carbon atoms. Examples of the organic diisocyanates which are particularly suitable include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethylcyclohexane (isophorone diisocyanate or IPDI), bis-(4-isocyanatocyclohexyl)-methane, 1,3- and 1,4-bis-(isocyanatomethyl)-cyclohexane, bis-(4-isocyanato-3-methyl-cyclohexyl)methane, $\alpha,\alpha,\alpha',\alpha'$-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 1,3- and/or 1,4-phenylene diisocyanate, 2,4- and/or 2,6-toluylene diisocyanate, 2,4- and/or 4,4'-diphenylmethane diisocyanate and 1,5-diisocyanato naphthalene and mixtures thereof. Aromatic polyisocyanates containing 3 or more isocyanate groups such as 4,4',4''-triphenylmethane diisocyanate and polyphenyl polymethylene polyisocyanates obtained by phosgenating aniline/formaldehyde condensates may also be used. Preferred diisocyanates which may be blended with the required bis-(4-isocyanatocyclohexyl)-methane isomers are 1,6-hexamethylene diisocyanate and isophorone diisocyanate.

Polyamines which are employed herein as the B-side component can be polyoxyalkylene polyamines having a molecular weight of from about 400 to about 5000, and having from 2 to 3 primary amine groups. Such polyamines are known in the art. One method for preparing such amines is the amination of polyhydroxy polyethers (e.g., polypropylene glycols) by a reaction with ammonia in the presence of Raney nickel and hydrogen (Belgian Patent 634,741).

U.S. Pat. No. 3,654,370 discloses the preparation of polyoxyalkylene polyamines by reaction of the corresponding polyol with ammonia and hydrogen in the presence of a nickel, copper, or chromium catalyst. The preparation of polyethers containing amino end groups by the hydrogenation of cyanoethylated polyoxypropylene ethers is described in German Patent 1,193,671. Other methods for the preparation of polyoxyalkylene polyamines are described in U.S. Pat. Nos. 3,155,728 and 3,236,895 and French Patent 1,551,605. Commercially available polyether polyamines are sold by Texaco under the Jeffamine tradename.

Preferred herein are amine-terminated polyethers which can be prepared by reacting a polyfunctional acetoacetic acid ester with a polyamino compound. Said amine-terminated polyethers are more fully disclosed in U.S. patent application Ser. No. 07/562,293, filed Aug. 3, 1990.

Generally the fast reacting polyamines can be represented by the formula:

where R is a substituted or unsubstituted hydrocarbyl group, e.g., $C_3$ to $C_{10}$ straight or branched chain alkylene group or a $C_4$ to $C_{15}$ alicyclic group. Useful diamines include the various straight and branched chain isomers of diaminopropane, diaminobutane, diaminopentane, diaminohexane, diaminoheptane, diaminooctane, diaminononane, and diaminodecane. Specific useful diamines include 1,2- and 1,3-diaminopropane; 1,3-, 2,3-, and 1,4-diaminobutane; 1,2-diamino-2-methylpropane; 1,5-diaminopentane; 1,4-diamino-1-methylbutane; 1,4-diamino-2-methylbutane; 1,3-diamino-1-ethylpropane; 1,3-diamino-1,1-dimethylpropane; 1,3-diamino-1,2-dimethylpropane; 1,3-diamino-2,2-dimethylpropane; 1,5-diamino-2-methylpentane.

Also suitable are so-called amine terminated polyethers containing primary or secondary (preferably primary) aromatically or aliphatically (preferably aliphatically) bound amino groups, wherein amino end groups can also be attached to the polyether chain through urethane or ester groups. These amine terminated polyethers can be prepared by any of several methods known in the art. For example, amine terminated polyethers can be prepared from polyhydroxyl polyether (e.g., polypropylene glycol ethers) by a reaction with ammonia in the presence of Raney nickel and hydrogen (Belgian Patent No. 634,741). Polyoxyalkylene polyamines can be prepared by reaction of the corresponding polyol with ammonia and hydrogen in the presence of a nickel, copper, chromium catalyst (U.S. Pat. No. 3,654,370). hers containing amino end groups by the hydrogenation of cyanoethylated polyoxypropylene ethers is described in Germany Patent 1,193,671. Other methods for the preparation of polyoxyalkylene (polyether) amines are described in U.S. Pat. Nos. 3,155,728 and 3,236,895 and in French Patent No. 1,551,605. French Patent No. 1,466,708 discloses the preparation of polyethers containing secondary amino end groups. Also useful are the polyether polyamines described in U.S. Pat. Nos. 4,396,729, 4,433,067, 4,444,910 and 4,530,941.

Aminopolyethers obtained by the hydrolysis of compounds containing isocyanate end groups can be employed herein. For example, in a process disclosed in German Offenlegungsschrift 2,948,419, polyethers containing hydroxyl groups (preferably two or three hydroxyl groups) react with polyisocyanate groups are then hydrolyzed in a second step to amino groups. Preferred amine terminated polyethers are prepared by hydrolyzing an isocyanate compound having an isocyanate group content of from 0.5 to 40% by weight. The most preferred polyethers are prepared by first reacting a polyether containing two or four hydroxyl groups with an excess of an aromatic polyisocyanate to form an isocyanate terminated prepolymer and then converting the isocyanate groups to amino groups by hydrolysis. Processes for the production of useful amine terminated polyethers using isocyanate hydrolysis techniques are described in U.S. Pat. Nos. 4,386,218, 4,456,730, 4,472,568, 4,501,873, 4,515,923 4,525,534, 4,540,720, 4,578,500 and 4,565,645; European Patent 097,299; and German Offenlegungsschrift 2,948,419, all the disclosures of which are herein incorporated by reference. Similar products are also described in U.S. Pat. Nos. 4,506,039, 4,525,590, 4,532,266 and 4,532,317 and in U.S. application Ser. Nos. 437,641 (filed Oct. 19, 1982), 778,656 Sep. 23, 1985), 895,629 (filed Aug. 11, 1986), 908,535 (filed Sep. 16, 1986), and 916,923 (filed Oct. 9, 1986).

The amine terminated polyethers used in the present invention are in many cases mixtures with any of the above-mentioned compounds. These mixtures generally should contain (on a statistical average) two or three isocyanate reactive amino end groups.

The isocyanate or a prepolymer thereof or their mixture, and the polyamine are employed in the ratio of 1:10 to 10:1 and preferably 3:1 to 1:3.

Catalysts are also frequently used according to the invention. The catalysts added are generally known and include tertiary amines such as triethylamine, tributylamine, N-methylmorpholine, N-ethylmorpholine, The products of the process of the present invention are preferably compact molded articles. However, blowing agents may be used to produce molded articles having a compact surface and a cellular interior. N-cocomorpholine, N,N,N',N''-tetramethyl-ethylene-diamine, 1,4-diaza-bicyclo-2,2,2)-octane, N-methyl-N'-dimethyl-aminoethylpiperazine, N,N-dimethylbenzylamine, bis-(N,N-diethyl-aminoethyl)-adipate, N,N-diethylbenzylamine, pentamethyl-diethylenetriamine, N,N-dimethyl- cyclohexylamine, N,N,N',N'-tetramethyl-1,3-butanediamine, N,N-dimethyl- -phenylethylamine, 1,2-dimethylimidazole, 2-methylimidazole and the like. Also useful are the commercially available tertiary amines such as Niax A1 and Niax A107, available from Union Carbide; Thancat DD, available from Texaco; and the like. Mannich bases known per se obtained from secondary amines such as dimethylamine and aldehydes, preferably formaldehyde, or ketones such as acetone, methyl ethyl ketone or cyclohexanone and phenols such as phenol nonylphenol or bisphenol may also be used as catalysts. Examples of catalysts which consist of tertiary amines having hydrogen atoms which are reactive with isocyanate groups include triethanolamine, triisopropanolamine, N-methyldiethanolamine, N-ethyl-diethanolamine, N,N-dimethylethanolamine and their reaction products with alkylene oxides such as propylene oxide and/or ethylene oxide Silylamines having carbon-silicon bonds as described, e.g., in German Patent No. 1,229,290 and U.S. Pat. No. 3,620,984 may also be used as catalysts. Examples include 2,2,4-trimethyl-2-silamorpholine and 1,3-diethylaminoethyltetramethyldisoloxane.

Basic nitrogen compounds such as tetraalkylammonium hydroxides, alkali metal hydroxides such as sodium phenolate and alkali metal alcoholates such as sodium methylate may also be used as catalysts. Hexahydrotriazines are also suitable catalysts.

Organic metal compounds may also be used as catalysts according to the invention, in particular organic tin compounds. The organic tin compounds used are preferably tin(II) salts of carboxylic acids such as tin(II) acetate, tin(II) octoate, tin(II) ethyl hexoate and tin(II) laurate and tin(IV) compounds such as dibutyl tin oxide, dibutyl tin dichloride, dibutyl tin diacetate, dibutyl tin dilaurate, dibutyl tin maleate or dioctyl tin diacetate. All the above-mentioned catalysts may, of course, be used as mixtures.

Further examples of catalysts which may be used according to the invention and details concerning the activity of the catalysts are known and are described, e.g., in Kunststoff-Handbuch, Volume VII, published by Vieweg and Hochtlen, Carl-Hanser-Verlag, Munich 1966, pages 96 to 102.

The catalysts, when used, are generally used in a quantity of between about 0.001 and 10%, by weight, based on the quantity of primary hydroxyl group containing polyethers.

Surface active additives such as emulsifiers and foam stabilizers may also be used according to the invention. Suitable emulsifiers include, e.g., the sodium salts of ricinoleic sulphonates or salts of fatty acids with amines such as oleic acid diethylamine or stearic acid diethanolamine. Alkali metal or ammonium salts of sulphonic acids such as dodecylbenzene sulphonic acid or dinaphthylmethane disulphonic acid or of fatty acids such as ricinoleic acid or of polymeric fatty acids may also be used as surface active additives.

Polyether siloxanes are particularly suitable foam stabilizers, especially useful are those which are water soluble. These compounds generally have a polydimethyl siloxane group attached to a copolymer of ethylene oxide and propylene oxide. Foam stabilizers of this kind are known and have been described, for example, in U.S. Pat. Nos. 2,834,748, 2,917,480 and 3,629,308. It may, however, be advantageous to carry out the process according to the invention without foam stabilizers.

Other additives which may also be used according to the invention include reaction retarders, e.g., substances which are acid in reaction such as hydrochloric acid or organic acid halides, cell regulators such as paraffins or fatty alcohols or dimethyl polysiloxanes, pigments, dyes, flame retarding agents such as tris-chloroethyl phosphate, tricresyl phosphate or ammonium phosphate and polyphosphates, stabilizers against ageing and weathering, plasticizers, fungistatic and bacteriostatic substances, and fillers such as barium sulphate, kieselguhr, carbon black or whiting.

Other examples of surface active additives, foam stabilizers, cell regulators, reaction retarders, stabilizers, flame retarding substances, plasticizers, dyes, fillers, and fungistatic and bacteriostatic substances which may be used according to the invention and details concerning the use and mode of these additives are known and may be found, e.g., in Kunststoff-Handbuch, Volume VII, published by Vieweg and Hochtlen, Carl-Hanser-Verlag, Munich 1966, on pages 103 to 113.

According to the invention, the components may be reacted together by known processes often using mechanical devices such as those described in U.S. Pat. No. 2,764,565. Details concerning processing apparatus which may be used according to the invention may be found in Kunststoff-Handbuch, Volume VII, published by Vieweg and Hochtlen, Carl-Hanser-Verlag, Munich, 1966, pages 121 and 205.

So-called external mold release agents known in the art, such as silicone waxes and oils, are frequently used when foaming is carried out inside the molds. The process may also be carried out with the aid of so-called internal mold release agents, if desired, in combination with external mold release agents, e.g., described in German Offenlegungsschriften Nos. 2,121,670 and 2,307,589.

The use of additional components is not preferred, but when used, such components may provide certain processing or other advantages. For example, although the so-called external mold release agents are normally preferred, known internal mold release agents may also be used to produce molded articles which have excellent mold release characteristics. External mold release agents are among the auxiliary agents which may advantageously be used in the process of the present invention. In principle, any mold release agent known in the art may be used in the present invention but external mold release agents, such as silicone-based external mold release agents are preferred.

When used at all, internal mold release agents such as those described, for example, in German Offenlegungsschrift No. 1,953,637 (U.S. Pat. No. 3,726,952), German Offenlegungsschrift 2,121,670 (British Patent 3,365,215), German Offenlegungsschrift 2,431,968 (U.S. Pat. No. 4,098,731) or in German Offenlegungsschrift 2,404,310 (U.S. Pat. No. 4,058,492) are preferred. Preferred mold release agents include the salts (containing at least 25 aliphatic carbon atoms) of fatty acids having at least 12 aliphatic carbon atoms and primary mono-, di-, or polyamines containing two or more carbon atoms or amines containing amide or ester groups and having at least one primary, secondary or tertiary amino groups; other salts of carboxylic acids and tertiary amines; esters or mono- or polyfunctional carboxylic acids and polyfunctional alcohols containing saturated or unsaturated carboxyl or hydroxyl groups and having hydroxyl or acid numbers of at least five; ester type reaction products of ricinoleic acid and long chained fatty acids; and natural or synthetic oils, fats, or waxes. A particularly preferred mold release agent includes the oleic acid or tall oil fatty acid salts of the amide-containing amine obtained by the reaction of N-dimethylaminopropylamine with oleic acid or tall oil fatty acid.

When carrying out the process of the present invention, the quantity of prepolymer should preferably be such that the isocyanate index is from about 95 to about 110 in the reaction mixture. By "isocyanate index" is meant that the quotient of the number of isocyanate groups divided by the number of isocyanate-reactive groups, multiplied by 100. When calculating the isocyanate index, any isocyanate-reactive groups possibly present in the mold release agents (e.g., carboxyl groups) are not taken into account.

The process of the present invention is carried out by the known reaction injection molding technique, or RIM process. Two streams are generally employed in this molding technique. In the present invention, the prepolymer is the first stream and the diamine chain extender makes up the second stream. If any auxiliary agents or additives are used, they are generally mixed with the chain extender. However, it may be advantageous, for example, when using a mold release agent containing isocyanate groups, to incorporate the release agent with the prepolymer before the RIM process is carried out. It is possible in principle to use mixing heads in which three or four separate components may be simultaneously introduced so that no preliminary mixing of the individual components is required. The quantity of reaction mixture introduced into the mold is generally calculated to produce molded articles having a density of from 0.8 to about 1.4 g/cm$^3$, preferably from 0.9 to 1.2 g/cm$^3$. When mineral fillers are used, however, the molded articles may have a density above 1.2 g/cm$^3$. The articles may be removed from the mold after a period of from about 5 to about 90 seconds, preferably from 20 to 60 seconds. The reactant mixture is generally introduced into the mold at a starting temperature of from about 10° to about 60° C., preferably from 20° to 50° C. The temperature of the mold itself is generally from about 40° to about 100° C., preferably from 50° to 70° C.

In the practice of this invention, one is able to fill large molds with the desired components, without encountering premature gelation. Advantageously, the physical properties of the resultant products are not adversely affected.

The invention is further illustrated but is not intended to be limited by the following examples in which all parts and percentages are by weight unless otherwise specified.

EXAMPLES

Example 1

NCO Prepolymer (A)

1500 grams of the polyether polyol E-9143 (which is prepared by reacting glycerine/propylene oxide/ethylene oxide triol having OH number of 35 (weight ratio of propylene oxide to ethylene oxide of 83:17 with the oxides being reacted sequentially) were slowly added to a rapidly stirring 2099 grams of diethyl methylene diisocyanate (DEMDI) at 60° C. After the completion of the addition of polyether polyol, the reaction was held at 60° C. for one hour.

The resultant prepolymer was degassed under vacuum and the percent NCO was determined by titration. The NCO content was about 15.4%.

(M1401) NCO Prepolymer (B)

A twelve liter flask was charged with 1590 g of MDI, 435 g of MRS-4 and 790 g of MR-5. The temperature of the isocyanate mixture was raised to 60° C. and E-9143 added slowly with stirring. At completion of the addition, the temperature was kept at 60° C. for one hour. The prepolymer was degassed o under vacuum. The NCO content was about 17.5%.

1. MDI-4,4'-diphenyl-methane-diisocyanate.
2. MRS-4-Polymeric MDI which has 66% total monomer of which 19% is 2,4'- and 2.6% is 2,2'-MDI. Total NCO=32.6.
3. MR-5-Polymeric MDI with 57% total monomer of which 2.6% is 2,4'-MDI. Total NCO=32.6.

Example 2

In the preparation of panels, the components of the B-side were accurately weighed into a suitable container and mixed, using an air driven two blade mixer. The resultant mixture was then taken to the metering equipment. The metering equipment was flushed with the mixture and calibrated for the desired foam index.

The mixture was mixed with the isocyanate using high metering equipment, as follows: RIM plaques were prepared using a laboratory piston metering unit and clamping units. The metering unit was a two component instrument having a maximum metering capacity of 0.6 liters. A rectangular mold, 300 mm×200 mm×3 mm was used to mold the samples under the following conditions:

| | |
|---|---|
| Component A (prepolymer) temperature | 40° C. |
| Component B (NCO reactive) temperature | 60° C. |
| Isocyanate Index | 105 |
| Mold temperature | 65° C. |
| Demold time | 30 sec |

The formulations used and the results obtained were as reported in the following table. The samples were tested for density (ASTM D-792), flex modulus (ASTM D-790), elongation (ASTM D-638), heat sag (ASTM D-3769), and notched Izod (ASTM D-256).

Before making the test panels, the flowability characteristics of the test systems was determined using the servodyne activity method. The servodyne is used to measure the time between mixing the reactive components and formation of a completely solid polymer. It is known that a system having a servodyne activity of about 1.5 seconds will provide excellent processing. In the systems illustrated in the following tables, the ideal servodyne activity ranged from about 2 to about 4 seconds.

TABLE 1

| Polyol Component | OH# | Amount (g) | Amount (g) |
|---|---|---|---|
| T5000[1] | 33.7 | 54.0 | 54.0 |
| D2000[2] | 56.1 | 23.1 | 23.1 |
| E505[3] | 629 | 22.9 | 22.9 |
| Isocyanate Component | NCO % | | |
| NCO - prepolymer B | 17.5 | 78.7 | |
| NCO - prepolymer A | 15.4 | | 89.4 |
| Servodyne Results | | | |
| Solution Time(s) | | 159 | 195 |

[1]Polyoxypropylene oxide triol based aliphatic polyamine with a molecular weight of 5000, available from Texaco Chemical Co. (Jeffamine)
[2]Polyoxypropylene diol based aliphatic polyamine having molecular weights of 2000 available from Texaco Chemical Co. (Jeffamine)
[3]An 80:20 mixture of 1-methyl-3,5-diethyl, 2,4- and 2,6-phenyl diamine.

The foregoing shows the solution and neat servodyne comparison of a prepolymer diethyl methylene diisocyanate (DEMDI) of the invention, i.e., prepolymer A and an MDI/polymeric isocyanate prepolymer B. The solution servodyne clearly shows that the DEMDI prepolymer slows down the reaction between the isocyanates and amines (Jeffamines available from Texaco).

TABLE 2

| Component | NCO % | OH# | Amount (g) | | |
|---|---|---|---|---|---|
| E9139[1] | | 28 | 82.2 | 82.2 | 82.2 |
| E505[2] | | 629 | 17.6 | 17.6 | 17.6 |
| T-12[3] | | 0 | 0.1 | 0.1 | 0.1 |
| 33LV[4] | | 0 | 0.1 | 0.1 | 0.1 |
| MONDUR PF[5] | 22.6 | | 46.6 | | |
| DEMDI | 27.6 | | | 38.1 | |
| NCO Prepolymer A | 15.4 | | | | 68.4 |
| Solution Time(s) | | | 43.5 | 480 | 229 |
| Neat Time(s) | | | 4.5 | 8.0 | 13.4 |

[1]Glycerine - PO-EO (85% I° OH) 28 OH Number, Viscosity of 1150 mPa.s at 25° C.
[2]An 80:20 mixture of 1-methyl-3,5-diethyl-2,4- and 2,6-phenyl diamine.
[3]Dimethyl tin dilaurate.
[4]4-diazabicylo[2.2.2]octane as 33% solution in dipropylene glycol.
[5]Liquid diphenylmethane diisocyanate available from Mobay Corporation.
The above shows the slow down effect of pure DEMDI and its prepolymer A.

TABLE 3

Polyurea Servodyne Jeffamine Systems (105% Index)
(Comparing MDI Prepolymer to Blends of MDI prepolymer/Pur DEMDI)

| Polyol Component | OH # | Amount (g) | Amount (g) | Amount (g) | Amount (g) |
|---|---|---|---|---|---|
| T5000 | 33.7 | 53.35 | 53.35 | 53.35 | 53.35 |
| D2000 | 56.1 | 22.87 | 22.87 | 22.87 | 22.87 |
| E505 | 629 | 22.1 | 22.1 | 22.1 | 22.1 |
| Zn Stearate | 0 | 1.14 | 1.14 | 1.14 | 1.14 |
| L-5304[1] | 0 | 0.54 | 0.54 | 0.54 | 0.54 |
| Isocyanate Component | NCO % | | | | |
| NCO Prepolymer B | 17.5 | 76.1 | 7.2 | 13.6 | 19.5 |
| DEMDI | 27.6 | | 64.7 | 54.5 | 45.4 |
| Servodyne Neat Time(s) | | 0.3 | 0.4 | 0.46 | 0.5 |

[1]A silicone surfactant available from Union Carbide Co.
The above shows the slow down effect of DEMDI when blended with MDI prepolymers. The neat Servodyne shows the slow down effect.

TABLE 4

Comparing MDI Prepolymer to DEMDI Prepolymer at Same NCO % and Demonstrating Reduced Reactivity Via the Maximum Attainable Shot Time

|  | A | B |
|---|---|---|
| T-5000 | 53.35 | 53.35 |
| D-2000 | 22.87 | 22.87 |
| E505 | 22.1 | 22.1 |
| Zinc Stearate | 1.14 | 1.14 |
| L-5304 | 0.54 | 0.54 |
| Mondur PF | 59.1 | |
| NCO Prepolymer C* | | 59.6 |
| Density (lb/cu ft) | 68.8 | 67.8 |
| Tear Strength (pli) | 771 | 621 |
| Elongation (%) | 208 | 330 |
| Tensile Strength (psi) | 4729 | 4246 |
| Flex Modulus (psi) | 86250 | 56350 |
| Heat Sag (mm) 6" @ 250 f 1 hr | 10.2 | 8.0 |
| Heat Sag (mm) 4" @ 325 f 1 hr | 47.7 | 41.2 |

*Made from DEMDI and tripropylene glycol (TPG), 22.44 NCO %.
The longest possible shot time for A was 1.5 whereas B was 2.6 seconds.

Table 4 shows the physical properties of an MDI system and a DEMDI system at the same % NCO content. The physical properties are very close showing that there is little sacrifice of properties when DEMDI is used. However, the DEMDI showed a substantially improved shot time for the RIM formation.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An improved polyurea system comprising a reaction product of a polyisocyanate and a polyamine and an amine chain extender, the improvement comprising the polyisocyanate containing diethyl methylene diphenyl diisocyanate, a prepolymer thereof or a mixture thereof, in an amount sufficient to slow down the reaction for use in a reaction injection molding.

2. The polyurea system of claim 1 wherein the isocyanate content is in an amount of 4.4 to 28 percent by weight of the polyisocyanates.

3. The polyurea system of claim 1 wherein the polyamine is an amine terminated polyether.

4. In an improved process for preparing a polyurea system comprising reacting a polyisocyanate with a polyamine, the improvement wherein the polyisocyanate is diethyl methylene diphenyl diisocyanate, a prepolymer thereof or a mixture thereof.

5. The process of claim 4 wherein the isocyanate content is in an amount of 14 to 27 percent.

6. The process of claim 4 wherein the polyamine is an amine terminated polyether.

* * * * *